United States Patent
Peters

(10) Patent No.: US 10,856,463 B2
(45) Date of Patent: Dec. 8, 2020

(54) METHOD FOR OPERATING A HARVESTING MACHINE WITH THE AID OF A PLANT GROWTH MODEL

(71) Applicant: Bayer CropScience AG, Monheim am Rhein (DE)

(72) Inventor: Ole Peters, Düsseldorf (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 0 days.

(21) Appl. No.: 15/765,787

(22) PCT Filed: Sep. 30, 2016

(86) PCT No.: PCT/EP2016/073400
§ 371 (c)(1),
(2) Date: Apr. 4, 2018

(87) PCT Pub. No.: WO2017/060168
PCT Pub. Date: Apr. 13, 2017

(65) Prior Publication Data
US 2018/0295771 A1   Oct. 18, 2018

(30) Foreign Application Priority Data

Oct. 5, 2015  (EP) .................................... 15188312

(51) Int. Cl.
*A01B 79/00* (2006.01)
*A01D 41/127* (2006.01)
*A01D 43/08* (2006.01)

(52) U.S. Cl.
CPC .......... *A01B 79/005* (2013.01); *A01D 41/127* (2013.01); *A01D 43/085* (2013.01)

(58) Field of Classification Search
CPC ... A01B 79/005; A01D 43/085; A01D 41/127
See application file for complete search history.

(56) References Cited

U.S. PATENT DOCUMENTS

| 5,666,793 A | 9/1997 | Bottinger |
| 5,995,895 A | 11/1999 | Watt et al. |
| 7,194,965 B2 | 3/2007 | Hickey et al. |
| 9,301,446 B2 | 4/2016 | Peters et al. |
| 9,485,905 B2 | 11/2016 | Jung et al. |
| 2010/0290878 A1* | 11/2010 | Ricketts ............... A01D 90/105 414/505 |

(Continued)

FOREIGN PATENT DOCUMENTS

| DE | 4431824 C1 | 5/1996 |
| DE | 102005000770 B3 | 7/2006 |

(Continued)

OTHER PUBLICATIONS

Arnold, J.G. et al. (Jul. 1995) "Chapter 8. Plant Growth Component" located at https://www.ars.usda.gov/ARSUserFiles/50201000/WEPP/chap8.pdf, last visited May 8, 2018, 40 pages.

(Continued)

*Primary Examiner* — Yuen Wong
(74) *Attorney, Agent, or Firm* — Lowenstein Sandler LLP

(57) ABSTRACT

A method for operating a harvesting machine for harvesting a crop in a field, at least one operating value for a working part of the harvesting machine being determined in dependence on at least one plant property of the crop. The plant property is mapped in a plant growth model, the plant growth model modelling a development over time of the plant property and determining a predictive value or a predictive characteristic of the plant property for the time of the harvest.

14 Claims, 2 Drawing Sheets

(56) References Cited

U.S. PATENT DOCUMENTS

| | | | |
|---|---|---|---|
| 2012/0101784 A1 | 4/2012 | Lindores et al. | |
| 2012/0109614 A1 | 5/2012 | Lindores | |
| 2014/0215984 A1 | 8/2014 | Bischoff | |
| 2015/0105984 A1 | 4/2015 | Birrell et al. | |
| 2017/0089742 A1* | 3/2017 | Bruns | A01D 41/1273 |

FOREIGN PATENT DOCUMENTS

| | | |
|---|---|---|
| EP | 2586286 B1 | 5/2013 |
| EP | 2803256 A1 | 11/2014 |
| WO | 2013063106 | 5/2013 |

OTHER PUBLICATIONS

N. Oppelt, "Remote Sensing of Photosynthetic Parameters", Applied Photosynthetics, Chapter 7, 2012, pp. 141-164.

M. Söderström et al., "Swedish Farmers' Experiences of the Yara N-Sensor 1998-2003", Proc. of the 7th International Conf. on Precision Agriculture and Other Precision Resources Management, Minneapolis, 2004, 11 pages.

H. Auernhammer et al., "The Use of GPS in Agriculture for Yield Mapping and Tractor Implement Guidance", DGPS 91, Seiten 455 bis 465, 12 pages.

S.J. Maas, "GRAMI: A Crop Growth Model that can use Remotely Sensed Information", US Department of Agriculture, Agricultural Research Service, 1992, 84 pages.

C. Ferencz et al., "Crop Yield Estimation by Satellite Remote Sensing", Int. J. Remote Sensing, Oct. 20, 2004, vol. 25, No. 20, 38 pages.

D. Ehlert et al., "Pendulum Meter in Practical Operation," Landtechnik 58, 2003, 2 pages.

* cited by examiner

METHOD FOR OPERATING A HARVESTING MACHINE WITH THE AID OF A PLANT GROWTH MODEL

CROSS REFERENCE TO RELATED APPLICATIONS

This application is the national stage of International Application No. PCT/EP2016/073400, filed internationally on Sep. 30, 2016, which claims the benefit of European Application No. 15188312.1, filed Oct. 5, 2015, the entire contents of each of which are incorporated by reference herein.

FIELD OF THE INVENTION

The invention relates to a method for operating a harvesting machine for harvesting a crop in a field, at least one operating value for a working part of the harvesting machine being determined in dependence on a plant property of the crop.

BACKGROUND

The travelling speed with which the harvesting machine travels over the field in order to harvest the crop standing before it represents an example of such an operating value for the drive motor or the gear mechanism of the harvesting machine. The prior art discloses controllers which propose a value for the travelling speed in dependence on the plant property in the form of the height or the density of the crop stand.

DE 44 31 824 C1 discloses a method for operating a combine harvester, relying on a data register. Stored in the data register are area-specific yield data from the past, measured in dependence on location coordinates. The yield of a crop in this case also represents a plant property. In dependence on the current location coordinates of the combine harvester, data from the data register are used for the calculation of a setpoint value for the travelling speed of the combine harvester. The method consequently uses data from the past which can only to a certain extent be transferred to the current yield situation.

DE 10 2005 000 770 B3 describes a method for controlling working parts of a combine harvester with the aid of geo-referenced data, these data being obtained and recorded during the development of the biomass. The biomass data are used to create a reference map, which serves as a basis for controlling the combine harvester. In an exemplary embodiment, a biomass stand is surveyed in advance of the harvest on a geo-referenced basis by satellite-aided detection systems during the development of the biomass. This biomass stand can likewise be regarded as a plant property and is recorded in a biomass stand map. However, not all plant properties of the crop that have an influence on the operating values of the various working parts of the harvesting machine can be detected in this way. Also, there may be a certain time between the last recording of the biomass stand and the time of the harvest, with the result that current events before the harvest, such as a dry period or a time of intense rain, that may have a great influence on plant properties such as grain moisture content or straw moisture content are not taken into account.

EP 2 586 286 B1 discloses a method for the predictive investigation of a crop to be picked up by a harvesting machine, a sensor arrangement that is arranged on the harvesting machine contactlessly generating signals with regard to at least one plant property of the crop and using them to derive statistical values. Moreover, a measuring device detects a plant property of a crop that has actually been picked up in the harvesting machine. An evaluation unit in this case automatically determines relationships between the statistical values of the signals of the sensor arrangement and the signals of the measuring device. These relationships are then taken into account in the calculation of the plant property of the harvest to be picked up. The signals of the sensor arrangement are used for controlling the travelling speed of the harvesting machine, while taking into account the relationships determined. The travelling speed consequently depends on the absolute measured values of the contactless sensors of the sensor device, which however do not always operate sufficiently accurately in practice.

EP 2 803 256 A1 discloses a combine harvester with sensors attached to the roof of the driver's cab that allow contactless detection of a crop standing before the harvesting machine. This is used to prepare data regarding an expected mass throughput. Moreover, an actual mass throughput is determined by means of a measuring device. A controller for the travelling speed is designed such that the measured value of the measuring device and the expected mass throughput are compared with one another and the result of the comparison is used as a feedback value for setting a travelling speed of the harvesting machine. However, operating values of certain working parts of the combine harvester depend on plant properties, the detection of which by measuring means is very difficult and therefore often inaccurate. There is also the problem that the sensors attached on the roof of the driver's cab can of course only predictively determine plant properties to a certain extent, which means that great requirements are demanded of the control of the operating values of the combine harvester.

SUMMARY OF THE INVENTION

According to some embodiments, a method is provided for operating a harvesting machine for harvesting a crop by which an operating value for at least one working part of the harvesting machine can be determined easily and well. In some embodiments, the travelling speed of the harvesting machine during harvesting could be an operating value of the drive of the harvesting machine.

DETAILED DESCRIPTION OF THE INVENTION

Figure 1:
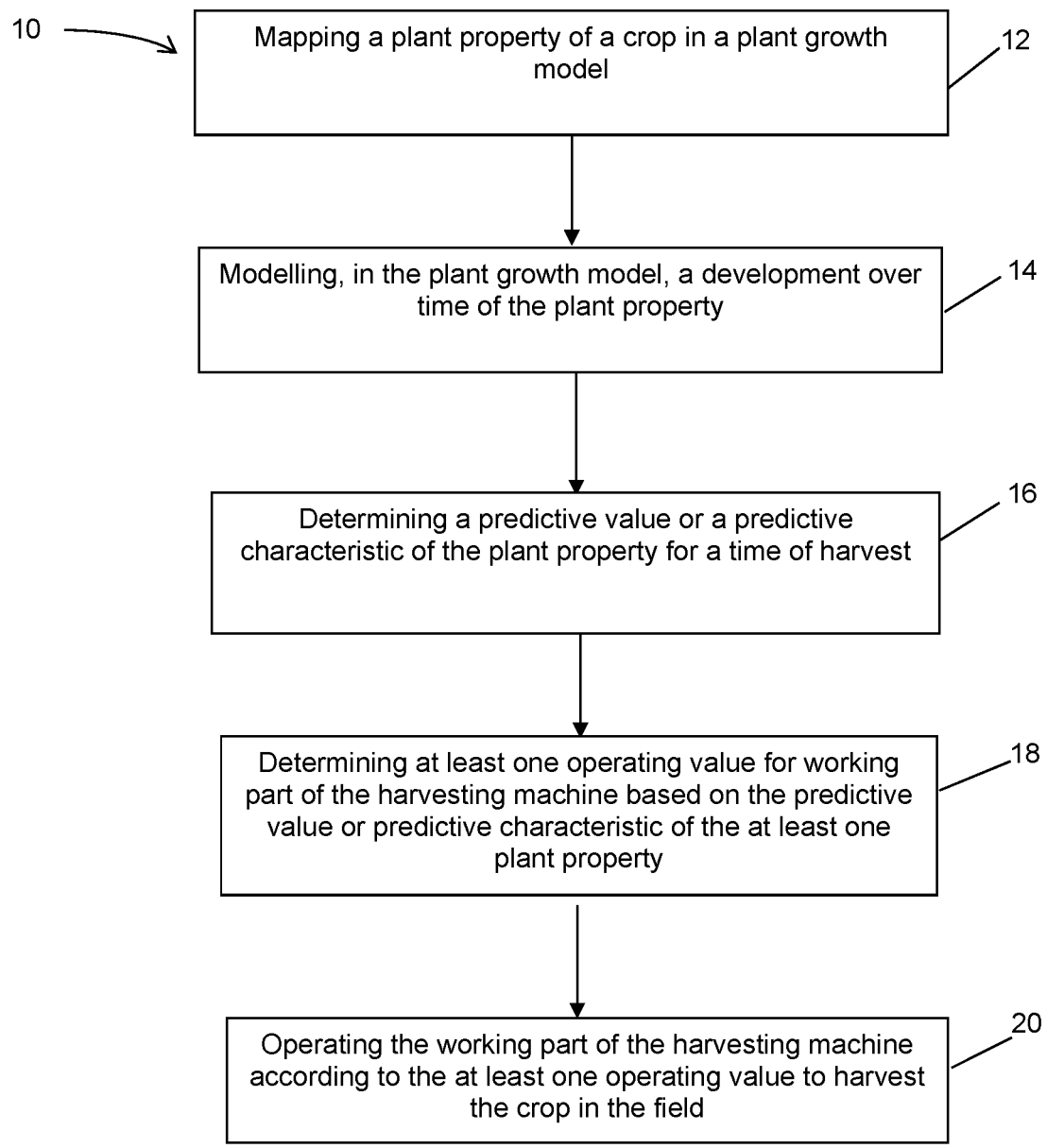
FIG. 1 illustrates an embodiment of a method for operating a harvesting machine for harvesting crop in a field.

According to some embodiments, at least one plant property is mapped in a plant growth model, the plant growth model modelling a development over time of the plant property and determining a predictive value or a predictive characteristic of the plant property for the time of the harvest.

The at least one plant property may be the biomass of the crop. The height or the density of the crop stand may also be mapped in the plant growth model as a plant property, for which a development over time is modelled there. The predictive value on the day of the harvest, for example for the height of the crop stand, can then be specified from this modelling.

Further examples of the plant property that can be recorded in the plant growth model are yield data for straw and yield data for grains in the case of cereal crops, grain moisture content and straw moisture content, corn cob diameter, height of initial growth of corn cobs, diameter of corn stalk, individual grain size (thousand grain weight), threshability (degree to which the ear crumbles), protein content in the case of cereal crops and disease pressure (mycotoxin content), stand height and position risk.

Preferably, the plant growth model records many different plant properties. When reference is made hereinafter to the plant property or to the at least one plant property, this includes all other plant properties that are modelled by the plant growth model.

For example, for corn as a crop, the plant properties of the corn cob diameter, diameter of the corn stalk and height of initial growth of the corn cob are taken into account and modelled in the plant growth model. One or more plant properties can be used to derive one or more further plant properties, such as for example the yield data for a crop. Generally, such a second plant property can be derived from a first plant property. Correspondingly, the plant growth model allows the derived second plant property to be represented in its variation over time if it is possible to access a variation over time of the first plant property.

The harvesting machine may be a combine harvester, forage harvester or other machine by which a standing or lying crop is picked up from a field and gathered, and thereby possibly passed on directly for further process steps.

In the case of a combine harvester, a height-adjustable cutting unit may be used for mowing grain crops, such as in particular cereal crops, which for the purpose of separating the grain and the straw may then be fed to a threshing unit, which has a threshing concave with a rotating threshing drum. By setting the drum speed and setting the threshing gap between the threshing drum and the threshing concave, the intensity of the threshing can be increased or reduced. The threshing unit may be followed by a separating device, in which the remaining grains and ears that have not been completely threshed out are separated from the straw. In a cleaning device, a further separation of grains and non-grain constituents may take place. The cleaning device preferably has screens and an air blower, with an air flow (wind) acting on the screens. The air flow serves the purpose that lighter constituents, such as the non-grain constituents, do not fall through the screens but are blown away, and consequently are separated from the grains that fall through the screens.

If for example the straw moisture content is mapped by the plant growth model, according to embodiments of the invention, a predictive value for the straw moisture content can be determined for the time of the harvest. If a high value is calculated by the plant growth model, a greater drum speed (operating value) can correspondingly be preset for the threshing unit (working part). The air flow too (here, the air flow represents a possible operating value of the blower as a working part) can correspondingly be set higher, since moister straw is heavier and therefore can only be blown away by a greater air flow.

In the case of a forage harvester, the straw moisture content may be used as an influencing variable for setting the cutting length. For dry silage, shorter cutting lengths are advantageous, in order that it can be compacted sufficiently.

If the individual grain size (thousand grain weight) is recorded as a plant property by the plant growth model, the threshing gap between the threshing drum and the threshing concave can be set in dependence on this parameter. In the case of small grains, the intensity of the air flow of the blower can be reduced, since otherwise an excessive proportion of grains is blown away with the non-grain constituents in the cleaning device. If a value for the threshability (degree to which the ears crumble) is available at the time of the harvest, a rather lower value can be set for the drum speed in the case of brittle ears, in order in this way to relieve the cleaning device downstream of the threshing unit, since a lower drum speed is generally accompanied by a smaller proportion of short straw in the cleaning device.

The adjustable spacing of picking plates may likewise represent an operating value that is determined in dependence on a plant property of the crop by the method according to embodiments of the invention. If, for example, the plant growth model specifies a value for the diameter of the corn stalk, the spacing of the picking plates can be correspondingly made to match. A well-set plate spacing ensures a clean feed and reduces the risk of blockages. As an alternative or in addition, the method may provide the corn cob diameter as an influencing variable for the spacing of the picking plates.

The height of the initial growth of the corn cobs, which can likewise be modelled by the plant growth model, may be used as an influencing variable for the height of the cutting unit. A cutting unit that is carried higher reduces the risk of damage and leads to a smaller power requirement at the cutting unit. The height of the cutting unit may also depend on the stand height of the crop calculated by the plant growth model or the storage risk.

In the case of corn, the biomass may serve as an influencing variable in the determination of a favourable or optimum travelling speed of the forage harvester. The yield data for straw in the case of cereal crops may influence the travelling speed of the combine harvester. Yield data with respect to the grains in the case of cereal crops can be used to set the speed of the air flow in the cleaning device. If the results of the plant growth model indicate very low values for the grain moisture content (very dry corn), corresponding settings of the working parts can be made in response to this in order to obtain less broken grain.

A further example is the yield formation in the cobs of the corn plant. If there is drought stress in the short phase during the blooming time, not all incipient grains are fertilized. The cobs contain significantly fewer grains. This relationship can be replicated in a plant simulation model, but not by means of remote sensing or environment-sensing sensors on a harvesting machine.

The predictive value or the predictive characteristic of the plant property in the field can be determined in a geo-referenced manner. This means that the predictive value or the predictive characteristic of the plant property can be assigned corresponding location coordinates in a certain spatial resolution. The result of such an assignment could be a map that represents the values of the plant property in high spatial resolution, such as for example 100 times 100 m, 50 times 50 m or even 5 times 5 m. An absolute value or else a relative values for one or more plant properties can be stored for each area element. Each area element may also be assigned only a qualitative class with regard to the plant property, for example of "1, 2, . . . 5" up to 5 or "very small, small, medium, large and very large". This map or a corresponding data record may be fed to a control device of the harvesting machine, the control device then setting the individual working parts such that their operating values lead to an optimum result of the harvest. Alternatively, it is possible that the operating values are only suggested to the driver of the harvesting machine, who then compares them with values from his personal experience and then himself sets the individual operating values for the working parts.

The plant growth model determines the predictive value or the predictive characteristic of the plant property for the time of the harvest, it being possible for this time to be for example a week or a day in or on which the harvest is to take place. It is however also possible that the time period is only a few hours, for example less than 3 hours, in order in this way to be able to specify precisely the value or the characteristic of a plant property that changes in the course of a day. The time of the harvest may therefore be understood as an input variable that is externally dictated. In an alternative exemplary embodiment, a preferred or optimum time period is calculated by the plant growth model.

In an exemplary embodiment, meteorological data that may have an influence on the value of the characteristic of the plant property are used. For example, the air temperature, the atmospheric humidity, the hours of sun and/or amounts of precipitation may be taken into account—preferably in high spatial resolution. These variables on the one hand have a decisive influence on the growth of the crop, and consequently influence many plant properties. On the other hand, they may also have a direct influence on some plant properties, such as for example the straw moisture content.

In the method according to an embodiment of the invention, soil data that have an influence on the growth of the crop may also be used. For example, the water content of the soil may be calculated for an area element of the field at different points in time in the growth period. On the basis of this value, the plant growth model can then model the amount of water that the crop extracts from the soil. The water content of the soil, preferably here too represented in high spatial resolution for individual area elements, may in this case also be calculated while taking into account the meteorological data.

In an exemplary embodiment, the plant growth model uses remote sensing data that are recorded by satellite. For example, a vegetation index (for example NDVI) can be calculated in a geo-referenced manner on the basis of satellite data and used to derive the biomass in the field. Such data for the vegetation index may on the one hand serve as a basis for other plant properties that cannot be detected by remote sensing. On the other hand, the remote sensing data may be used to verify and correspondingly adapt certain assumptions in the modelling of the plant growth. If, for example, the plant growth model calculates the biomass in the field, this plant property can be checked and possibly adapted by using the satellite data.

In addition, it is possible that the soil moistness of the ground is measured by means of the remote sensing. The moistness of the ground can in this case be taken into account in the calculation of the water content of the soil. In this case, the plant growth model would only use the data on the moistness of the ground indirectly, to be specific by modelling the water content of the soil. A measuring device may be attached to the harvesting machine, the predictive value or the predictive characteristic of the plant property being calculated on the basis of the signals of the measuring device. The measuring device may comprise a contactless sensor and/or a sensor for a crop that has actually been harvested. If, for example, the contactless sensor is attached on the roof of a driver's cab of the harvesting machine and designed to measure the stand height of the crop, its measurement results can be used to check and possibly adapt the stand height calculated by the plant growth model. If it is found that the stand height calculated by the plant growth model deviates from the measured stand height, at least this plant property can be correspondingly calibrated on the basis of this deviation. Such a calibration may also have an influence on other plant properties, which can then likewise be adapted. The calibration may be performed once at the beginning of a harvesting operation or else continually during the harvest, that is to say when the harvesting machine is travelling over the field and gathering the crop.

A calibration may also be performed by the sensor for the crop that is actually harvested. For example, in this way the weight of the harvested grain can be compared with the weight that could have been harvested on the basis of the plant growth model, while taking into account certain grain losses of the harvesting machine. Corresponding plant properties can then be readjusted. This calibration may also be performed in a geo-referenced manner, geo-referenced yield data of the sensor for the crop that is actually harvested being compared here with the corresponding geo-referenced in data of the plant growth model.

Past values from a previous growth period or a previous harvest may be used for the modelling of the plant property. In this way, certain assumptions in the modelling of the plant properties can be verified and formulated more precisely.

The field may be divided into segments, it then being possible to differentiate between segments of a first group and segments of at least one second group that differ from one another with regard to the plant property. For example, a threshold value for the protein content of the crop may be defined, with the result that all segments that lie below the threshold value are assigned to the first group and all segments that are characterized by a protein content above the threshold value are assigned to the second group. Depending on the spatial resolution, the segments may be the individual area elements, but they may also be made up of a number of area elements. In an exemplary embodiment, first the segments of the first group and then the segments of the second group are harvested. In this way it is possible to carry out a selective harvest that is characterized by different protein contents.

Another possibility is that a first crop container is filled when harvesting is carried out on one of the segments of the first group and that a second crop container is filled when harvesting is carried out on one of the segments of the second group. In this case, the harvesting machine comprises a separating device which fills the first crop container or the second crop container in dependence on the protein content as a plant property. Certain time delays, caused by the travelling speed of the harvesting machine and the time required to transport the crop from an area element of the field to the separating device in the harvesting machine, may be taken into account in the control of the separating device.

Another application for the selective harvest described above is the content of mycotoxins, which may likewise be the result of the calculations of the plant growth model. Here, too, a selective harvest can be performed by carrying out the harvest of the segments at different times (first the segments with a rather lower mycotoxin content, then the segments with a rather greater mycotoxin content are harvested) or be performed by the way in which the separating device is activated, feeding the crop either to the first crop container or to the second crop container.

Figure 2:
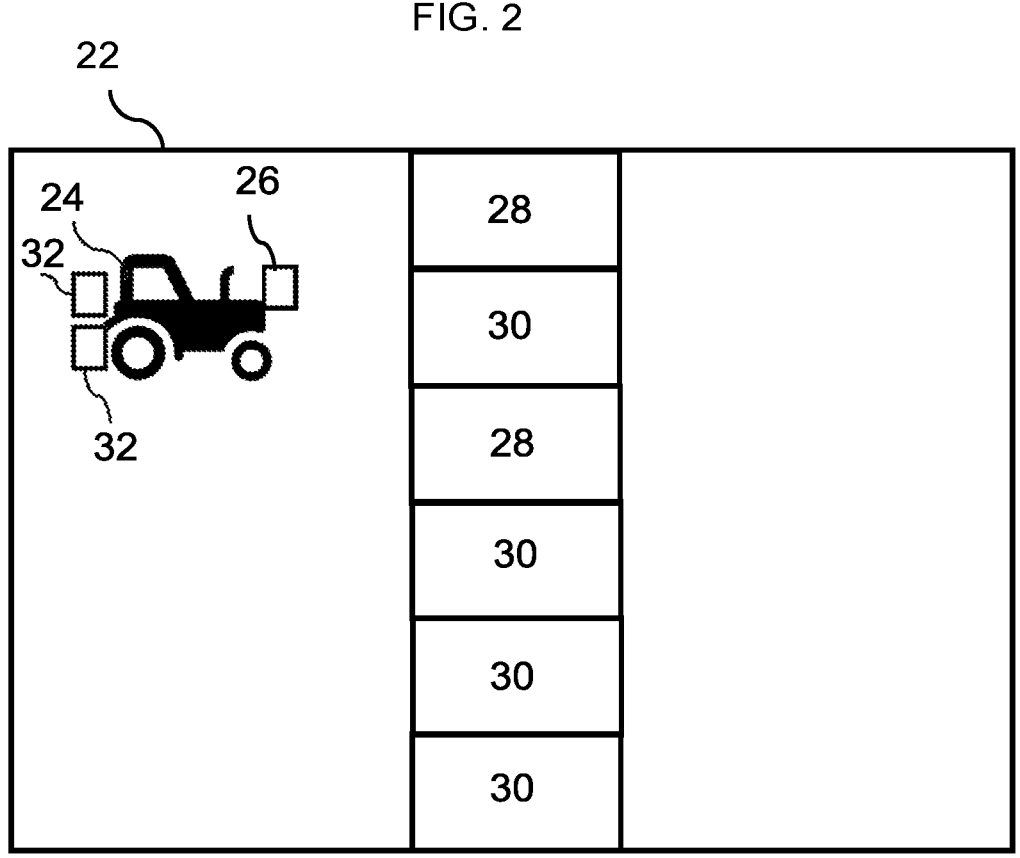
FIG. 2 illustrates an embodiment of a harvesting machine harvesting crop in a field.

FIG. 1 and FIG. 2 illustrate a method 10 for operating a harvesting machine 24 for harvesting a crop in a field 22. The method 10 comprises the steps of: mapping 12 a plant property of the crop in a plant growth model; modelling 14, in the plant growth model, a development over time of the plant property; determining 16 a predictive value or a predictive characteristic of the plant property for a time of harvest; determining 18 at least one operating value for a working part of the harvesting machine 24 based on the predictive value or predictive characteristic of the at least one plant property; and operating 20 the working part of the harvesting machine 24 according to the at least one operating value to harvest the crop in the field 22.

In one embodiment the plant property is a content of mycotoxins, a content of proteins, a straw moisture content, an individual grain size, or a threshability.

In a further embodiment the harvesting machine 24 is a combine harvester or a forage harvester.

In a further embodiment the predictive value or the predictive characteristic of the plant property is determined based on geo-referencing.

In a further embodiment the plant property represents a second plant property, which is derived from a first plant property.

In a further embodiment the plant growth model uses meteorological data.

In a further embodiment the plant growth model uses soil data.

In a further embodiment the plant growth model uses remote sensing data.

In a further embodiment a measuring device is attached to the harvesting machine 24, and the predictive value or the predictive characteristic of the plant property is calibrated based on signals from the measuring device 26.

In a further embodiment the measuring device 26 comprises a contactless sensor or a sensor for a crop that has been harvested.

In a further embodiment past values from a previous growth period or a previous harvest are used for the modelling of the plant property.

In a further embodiment the field 22 is divided into segments, and segments of a first group 28 are differentiated from segments 30 of at least one second group based on the plant property.

In a further embodiment comprising harvesting the segments of the first group 28 before the segments of the second group 30.

In a further embodiment comprising filling a first crop container 32 while harvesting at least one segment of the first group 28 and filling a second crop container 34 while harvesting at least one segment of the second group 30.

The invention claimed is:

1. A method for operating a harvesting machine for harvesting a crop in a field, the method comprising:
    mapping a plant property of the crop in a plant growth model;
    modelling, in the plant growth model, a development over time of the plant property;
    determining a predictive value or a predictive characteristic of the plant property for a time of harvest, wherein the predictive value or the predictive characteristic of the plant property is based at least partially on an assignment of the plant property to location coordinates with a spatial resolution of at least 5 times 5 meters;
    determining at least one operating value for a working part of the harvesting machine based on the predictive value or predictive characteristic of the plant property; and
    operating the working part of the harvesting machine according to the at least one operating value and the location coordinates to harvest the crop in the field, wherein the plant growth model uses at least one of meteorological data, soil data, and remote sensing data.

2. The method of claim 1, wherein the plant property is a content of mycotoxins, a content of proteins, a straw moisture content, an individual grain size, or a threshability.

3. The method of claim 1, wherein the harvesting machine Is a combine harvester or a forage harvester.

4. The method of claim 1, wherein the predictive value or the predictive characteristic of the plant property is determined based on geo-referencing.

5. The method of claim 4 wherein the field is divided into segments, and segments of a first group are differentiated from segments of at least one second group based on the plant property.

6. The method of claim 5, comprising harvesting the segments of the first group before the segments of the second group.

7. The method of claim 5, comprising filling a first crop container while harvesting at least one segment of the first group and filling a second crop container while harvesting at least one segment of the second group.

8. The method of claim 1, wherein the plant property represents a second plant property, which is derived from a first plant property.

9. The method of claim 1, wherein the plant growth model uses meteorological data.

10. The method of claim 1, wherein the plant growth model uses soil data.

11. The method of claim 1, wherein the plant growth model uses remote sensing data.

12. The method of claim 1, wherein a measuring device is attached to the harvesting machine, and the predictive value or the predictive characteristic of the plant property is calibrated based on signals from the measuring device.

13. The method of claim 12, wherein the measuring device comprises a contactless sensor or a sensor for a crop that has been harvested.

14. The method of claim 1, wherein past values from a previous growth period or a previous harvest are used for the modelling of the plant property.

* * * * *